United States Patent
Wesling et al.

(10) Patent No.: US 6,223,621 B1
(45) Date of Patent: May 1, 2001

(54) TWO AXIS BRAKE LEVER

(75) Inventors: Kevin F. Wesling, Lombard; Kent A. Solberg, Chicago; Brian T. Jordan, Chicago; John D. Cheever, Chicago; David J. Zimberoff, Elk Grove Village, all of IL (US)

(73) Assignee: Sram Corporation, Chicago, IL (US)

( * ) Notice: Subject to any disclaimer, the term of this patent is extended or adjusted under 35 U.S.C. 154(b) by 0 days.

(21) Appl. No.: 09/123,773

(22) Filed: Jul. 28, 1998

(51) Int. Cl.[7] .................. F16C 1/10; F16C 1/22; F16C 1/26
(52) U.S. Cl. ............... 74/501.5 R; 74/491; 74/502.6
(58) Field of Search ................ 74/501.5 R, 491, 74/501.6, 502.2, 502.6, 489

(56) References Cited

U.S. PATENT DOCUMENTS

| | | | |
|---|---|---|---|
| 5,538,270 | 7/1996 | Gajek et al. | 280/264 |
| 5,577,413 | * 11/1996 | Tagawa et al. | 74/475 |
| 5,697,159 | 12/1997 | Linden | 30/250 |
| 5,775,168 | * 7/1998 | Furuta | 74/489 |
| 5,813,501 | 9/1998 | Terry, Sr. | 188/344 |
| 5,832,782 | * 11/1998 | Kawakami | 74/473.13 |

FOREIGN PATENT DOCUMENTS

| | | |
|---|---|---|
| 37 06 545A1 | 9/1988 | (DE) . |
| 196 24 284A1 | 1/1997 | (DE) . |
| 0 731 019A | 9/1996 | (EP) . |

* cited by examiner

Primary Examiner—Charles A Marmor
Assistant Examiner—Tisha D. Waddell
(74) Attorney, Agent, or Firm—Piper Marbury Rudnick & Wolfe; Jefferson Perkins

(57) ABSTRACT

A brake operating device having a brake lever pivotally attached to a mounting bracket secured to a handlebar, the brake lever rotatable about a rotation axis that is offset from the pivot axis, and a transmission mechanism for converting a rotational force applied to the brake lever into a rectilinear force drawing the brake lever toward the handlebar. The transmission mechanism and brake lever configured to force rotation about the rotation axis in response to rotation of the brake lever about the pivot axis, the resulting compound motion of the brake lever following the natural arched motion of the rider's fingers during lever actuation.

8 Claims, 15 Drawing Sheets

NO CABLE PULL POSITION    NO CABLE PULL POSITION

FULL CABLE PULL POSITION    FULL CABLE PULL POSITION

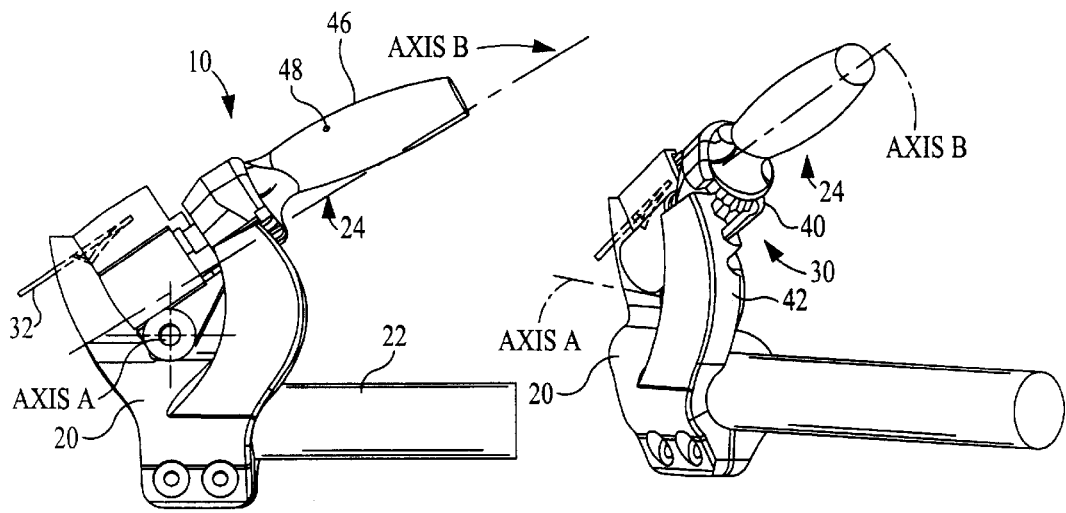
NO CABLE PULL POSITION
FIG. 1A
NO CABLE PULL POSITION
FIG. 1B
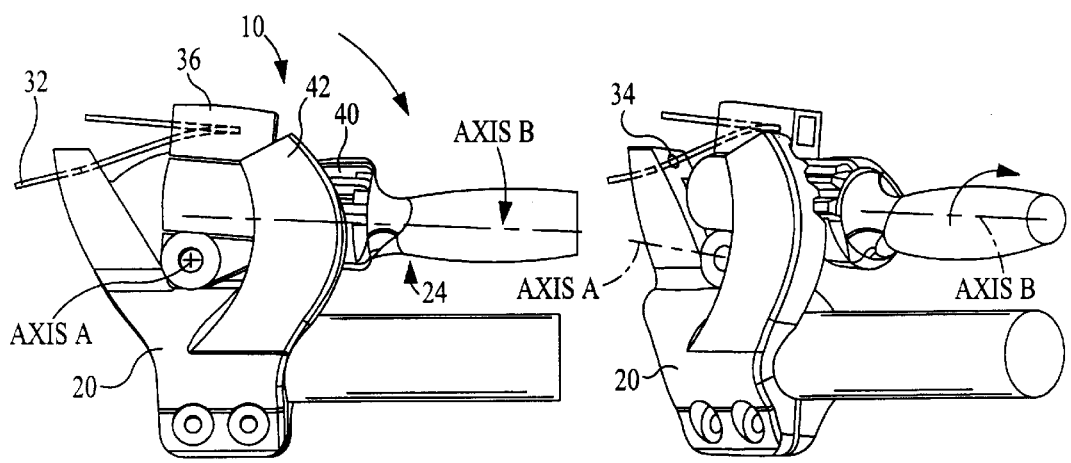
FULL CABLE PULL POSITION
FIG. 1C
FULL CABLE PULL POSITION
FIG. 1D

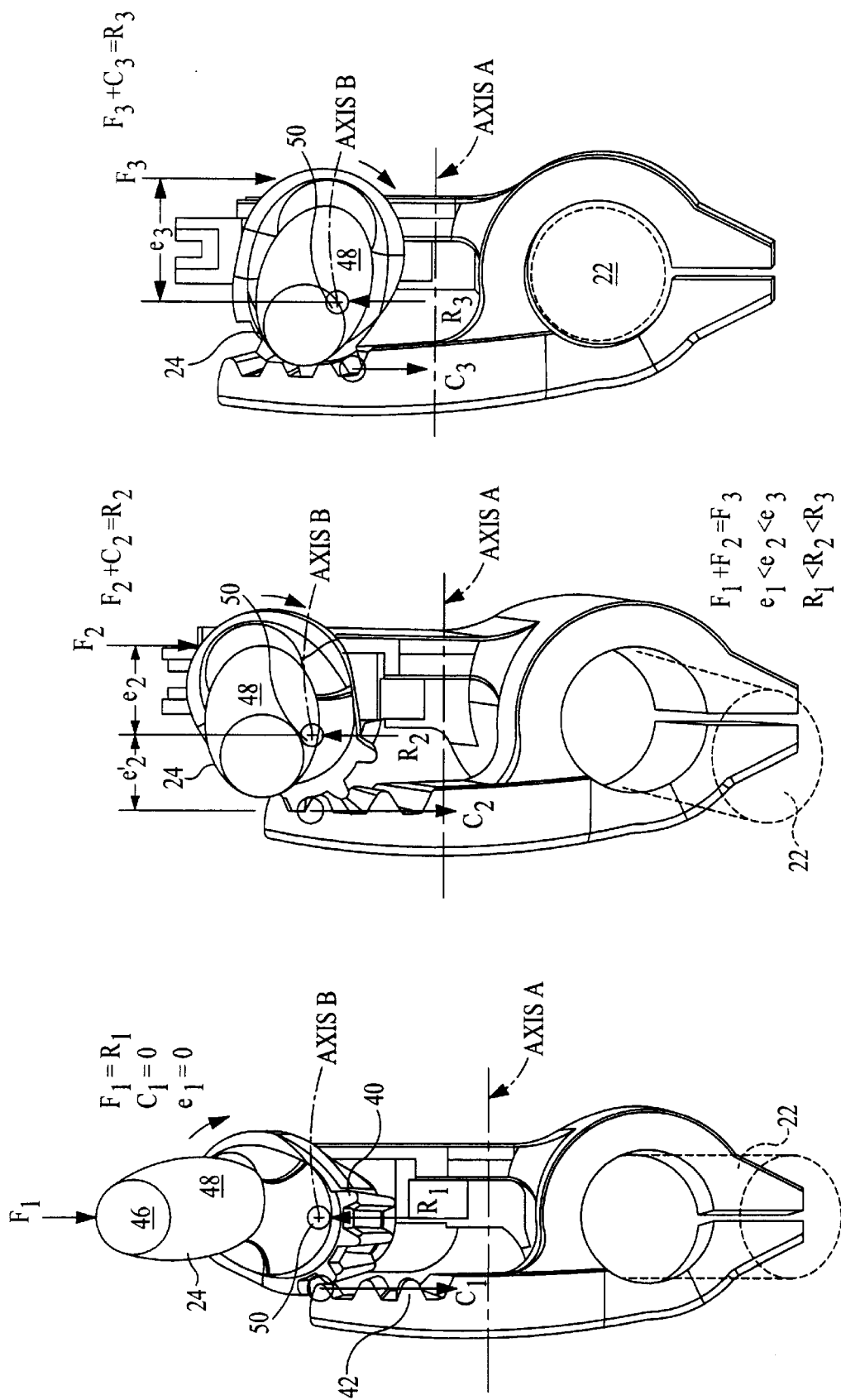

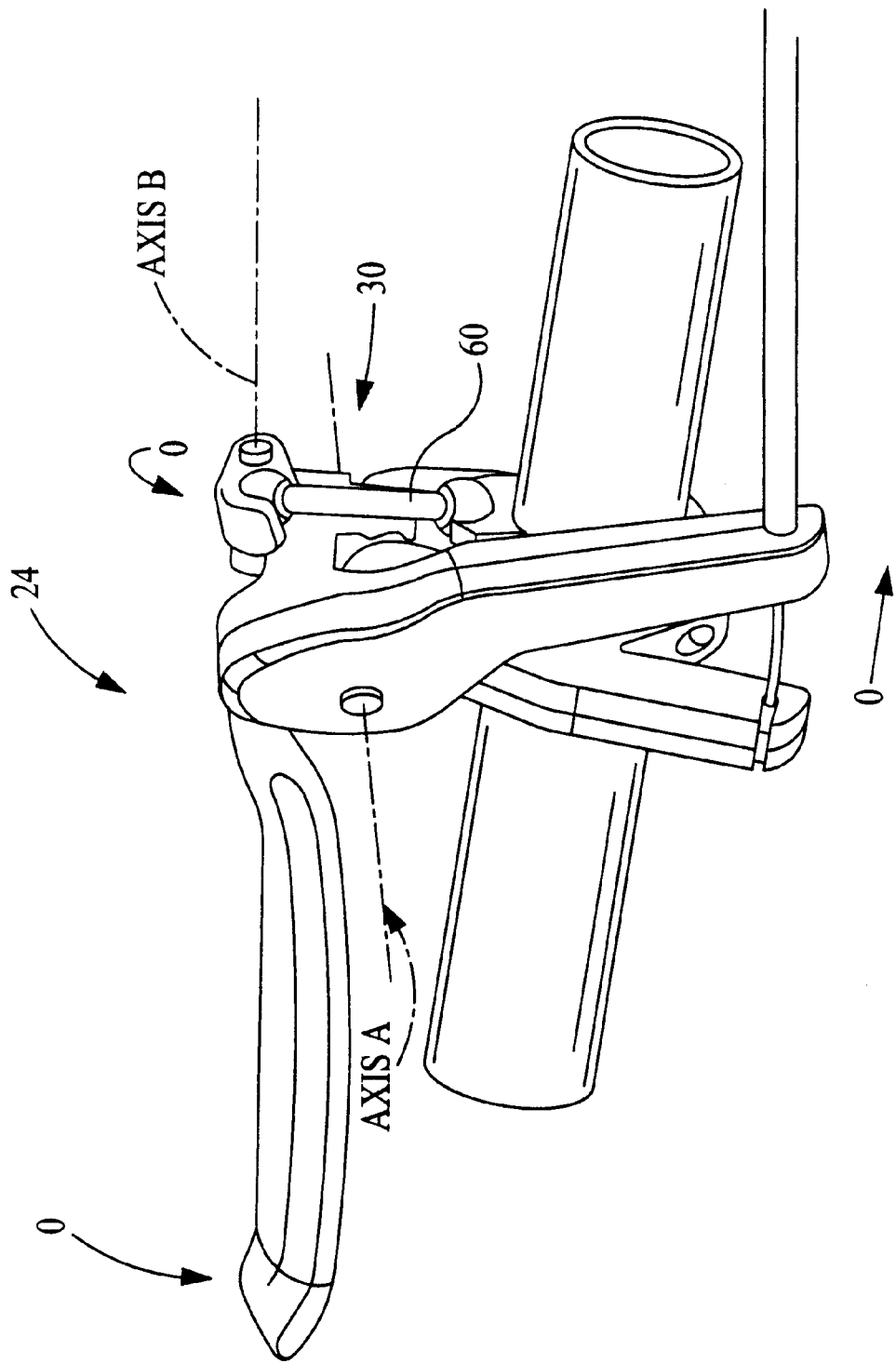

TWO AXIS BRAKE LEVER

TECHNICAL FIELD OF THE INVENTION

This invention relates in general to hand-actuated brakes, and more particularly to braking systems exhibiting an increase in mechanical advantage over the range of motion of a brake lever.

BACKGROUND OF THE INVENTION

Numerous types of bicycle brake mechanisms are known in the art, including drum brakes, cantilever brakes, disk brakes, caliper brakes and linear-pull brakes. One common feature of these brake mechanisms is that the braking force is a function of the force applied to a brake cable extending between the brake mechanism and a brake lever assembly (FIG. 9); a corresponding condition exists for hydraulic brakes. Various mechanisms have been incorporated in braking systems to increase the braking force during lever actuation, providing the rider with increasing braking power or mechanical advantage for slowing the bicycle. The present invention is an improvement to braking systems exhibiting increasing mechanical advantage.

Typically, a brake lever assembly consists of a brake handle including a finger grip bar and a cable pulling arm. The brake lever is attached to the bicycle handlebar by a mounting bracket for pivotal movement relative to the mounting bracket about a fixed axis. The brake cable is attached to the cable pulling arm a select distance from the fixed axis. As the finger grip bar is squeezed by a rider, the cable pulling arm pivots, increasing the tension on the brake cable, thereby actuating the brake mechanism. Once the brake mechanism is adjusted, the braking force is a function of how hard the finger grip bar is squeezed. How hard the finger grip must be squeezed and how far it must travel to provide a given braking force is known as the "feel" of the brakes.

Bicyclists, particularly avid bicyclists, each have a preferred feel for their bicycle brakes. Riders tend to anticipate the braking force that will result based upon the feel of their brakes. This feel is particularly important in high performance bicycling, such as off-road mountain biking, where too much braking force under certain conditions can cause the wheels to lock, resulting in a potentially dangerous loss of rider control. Likewise, too little braking force can have disastrous consequences. Thus, not only is a particular brake feel a matter of user preference, in performance situations a consistent feel contributes to rider safety. To complicate matters, as brake pads wear, the feel of the brakes can vary, particularly during off-road biking where dirt and grit increase brake pad wear and where brakes must be used often and aggressively.

With conventional brake lever assemblies, in order for a bicyclist to obtain a desired feel for the brakes, the brake mechanism itself must be adjusted. This is a time consuming and difficult process requiring special tools. Adjustments are particularly difficult under field conditions where a bicyclist either does not have the necessary tools or does not want to take the time to adjust the brake mechanism.

An alternative to adjustment of the brake mechanism to alter the brake feel known in the art, is providing a structure in the brake lever for varying the perpendicular distance between the fixed axis and the brake cable. This distance is known as the pivot arm. Known prior art devices provide a plurality of holes along the length of the brake lever at various distances from the fixed axis. While this structure does provide for coarse adjustment of the brake feel, the adjustment is only between pre-selected distances between the fixed axis and the point of attachment of the brake cable. Thus, only a limited number of pivot arm distances, and therefore brake feels, are available. In addition, while this structure does not require disassembly of the brake mechanism to adjust the brake feel, it does require disassembly of the brake lever assembly to reposition the point of attachment of the brake cable to the brake lever. Thus, adjustment of the brake feel with this structure is time consuming and requires tools which might not be available under field conditions.

Another prior art device employs a slotted brake lever whereby the point of attachment of the brake cable is allowed to transition between varying distances with respect to the fixed axis. Although the noted device provides a varying brake feel and more braking power, the device also suffers from several drawbacks. The most significant drawback is the abrupt transition of the mechanical advantage and hence, the force applied to the brake cable. The mechanical advantage is inversely proportional to the pivot arm. The smaller the pivot arm, the greater the power or braking force applied to the brake cable. Therefore, it is crucial that the increase in mechanical advantage be smoothly varying and therefore predictable.

Other devices achieve a mechanical advantage increase over the lever rotational range even with fixed cable attachment points, thereby eliminating complex slotted mechanisms while still providing increasing braking power. The brake mechanisms described above, however, all have in common a single axis design feature. The brake lever is pivotally attached to the mounting bracket and as the brake lever is drawn toward the handlebar, the lever sweeps across a single plane of motion. This type of design has several ergonomic drawbacks. In such conventional brake lever designs the rider's hand is forced to slide across the front surface of the finger grip bar and/or the knuckles are pinched upwards as the lever is drawn closer to the handlebar. This configuration not only results in uncomfortable rubbing and chafing of the rider's hand across the finger grip but also weakens the gripping power as the rider's hand is pinched upwards away from the handlebar. Providing a brake lever that simply rotates about a its longitudinal axis alone does not eliminate these drawbacks. Even so configured, the angle that the brake lever forms with respect to the handlebar is typically quite large to provide sufficient lever travel and the rider's hand is positioned further away from the pivot axis to provide the desired braking power. Such a configuration places the lever too far away from the rider's hand, especially for riders with smaller hands, and positions the weaker fingers at the maximum power region on the finger grip away from the pivot axis and the strongest fingers closer in where they are less effective in producing powerful braking.

Thus, it is desirable to provide a brake lever assembly that provides a comfortable brake lever that is easy to reach and that rotates about a second axis to follow the natural arcuate motion of the rider's hand during lever actuation, eliminating friction between the fingers and the finger grip bar while sweeping toward and downward along the handlebar to provide sufficient braking power with desired brake feel. A primary characteristic of the invention is that the arcuate or rotational motion of the brake lever is converted into a rectilinear force that boosts the braking power as the lever is drawn toward the handlebar.

SUMMARY OF THE INVENTION

It is therefore an object of the invention to provide a two-axis brake lever assembly that converts the rotational force imparted to the brake lever into a rectilinear force drawing the lever toward the handlebar.

It is a further object of the invention to provide a two-axis brake lever assembly that follows the natural motion of a rider's hand as the rider's fingers sweep toward and below the handlebar, the brake lever rotating to prevent any rubbing between the rider's fingers and the finger grip bar.

It is a further object of the invention to provide a two-axis brake lever assembly including a brake lever that is positioned substantially parallel to the handlebar, providing comfortable lever reach for the rider's hand and maximizing the braking power imparted by each finger to the finger grip bar, thereby providing "compacted" mechanical advantage benefits over conventional single axis brake levers.

A brake operating device according to one aspect of the invention includes a mounting bracket attached to a handlebar which has a cable guide. A brake lever is pivotally attached to the mounting bracket, the lever also being rotatable about a rotation axis that is offset from the pivot axis. One end of a brake cable is routed along the mounting bracket cable guide and attached to the brake lever. Preferably, a transmission mechanism converts the rotational force applied to the brake lever into a rectilinear force, drawing the brake lever toward the handlebar for more powerful braking.

Further objects and advantages of the invention will become apparent from a consideration of the drawings and ensuing description.

BRIEF DESCRIPTION OF THE DRAWINGS

Further aspects of the invention and their advantages will be discerned with reference to the appended drawings, in which like characters identify like parts and in which:

FIGS. 1a and 1c are top views of a rack and pinion or geared embodiment of a brake lever assembly according to the invention in which the transmission mechanism is disposed on the same side as the finger grip bar of a bicycle with respect to pivot axis A, the brake lever in undeflected and fully deflected positions, respectively;

FIGS. 1b and 1d are perspective views of FIGS. 1a and 1c, respectively;

FIGS. 2a–2c are outboard end views of the geared embodiment of FIGS. 1a–1d, the brake lever in undeflected, partially deflected, and fully deflected positions, respectively;

FIGS. 5a–5b are perspective views of an additional embodiment of the invention in which the transmission mechanism comprises a bar linkage, the brake lever being in undeflected and fully deflected positions, respectively;

DETAILED DESCRIPTION OF ILLUSTRATED EMBODIMENT

Figures 3A, 3B, 3C:
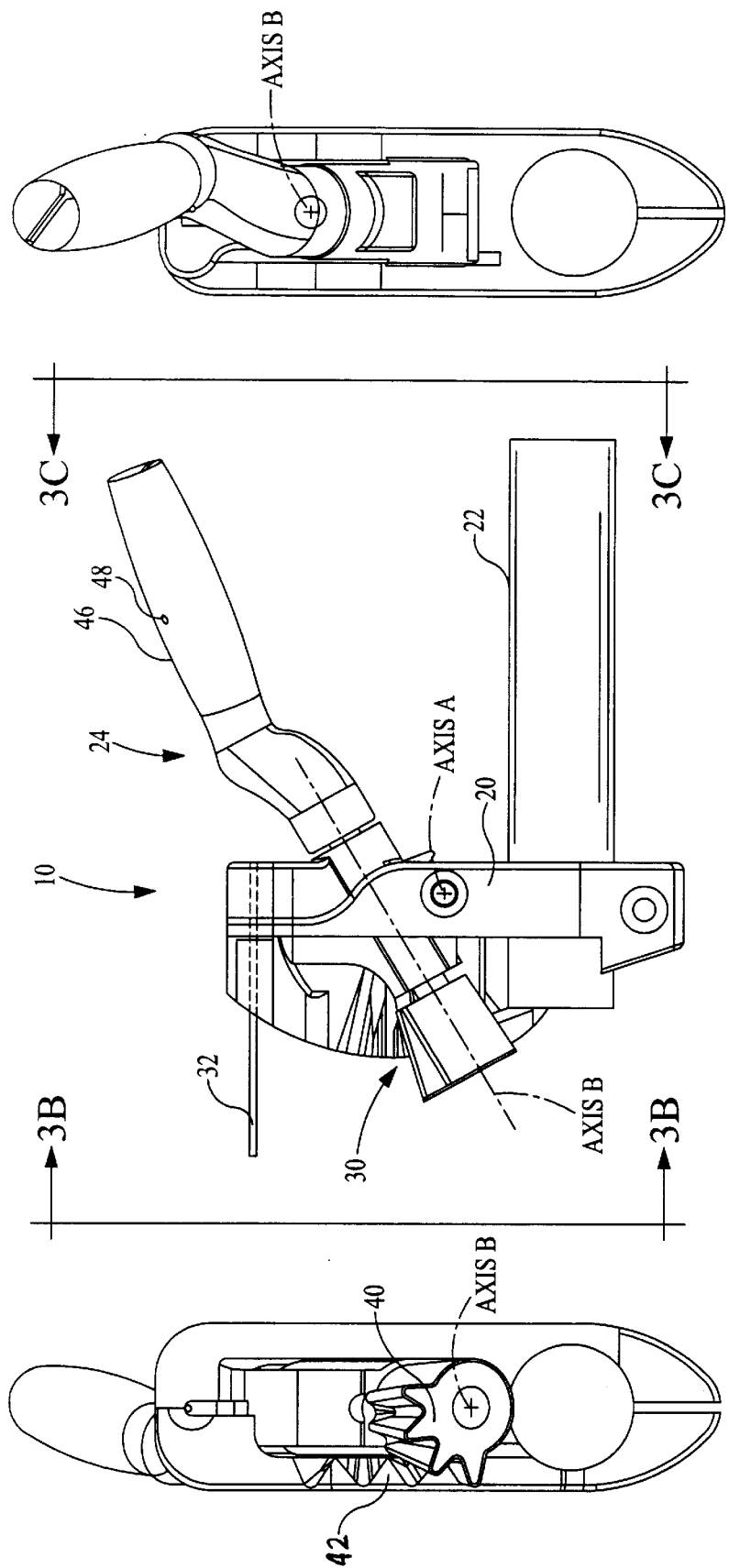
FIG. 3a is s top view of a second geared embodiment of the invention in which the transmission mechanism is disposed opposite the finger grip bar with respect to pivot axis A, the brake lever being in an undeflected position.
FIGS. 3b–3c are end views of the invention of FIG. 3a from opposite ends of the handlebar.

Referring to FIGS. 1a–1d and 2a–2c, there is shown one embodiment of the brake lever assembly of the invention. A lever assembly, indicated generally at 10, includes a mounting bracket 20 mounted to a handlebar 22, a brake lever 24 pivotally attached to mounting bracket 20 at a pivot axis A, the brake lever also rotatable about a rotation axis B, and a transmission mechanism 30. Axis A is, in the illustrated embodiment, orthogonal to and passes above the handlebar axis. Axis B is at a substantial and varying angle to axis A and is roughly coplanar with the handlebar axis, and ends its travel is a disposition roughly parallel to the handlebar axis. A brake cable 32 is routed along a cable guide 34 disposed on mounting bracket 20 and attached to a cable pulling arm 36, the cable pulling arm forming an extension of brake lever 24. In the embodiment of FIGS. 1a–1d and 2a–2c, the transmission mechanism 30 includes a pinion 40 formed on brake lever 24 in geared engagement with an upstanding rack 42 formed on mounting bracket 20.

In FIGS. 1a–1b, brake lever 24 is shown in its undeflected or fully retracted position, and is biased to this position by a compression spring (not shown) disposed between lever 24 and mounting bracket 20. During braking, a rider's thumb hooks around handlebar 22 as an anchor and the rider's fingers grasp a finger grip bar portion 46 of lever 24, causing the brake lever to pivot about axis A and concurrently to rotate about axis B, the rotation about axis B being forced by the transmission mechanism 30. Finger grip bar 46 includes a grasping surface 48 against which the rider's fingers effect an applied force of F1 (FIG. 2a) during brake lever actuation. At the onset of this pivoting/rotating motion of lever 24, pinion 40 engages rack 42, forcing the lever 24 to be displaced along an arcuate path, both toward the handlebar 22 (shown in phantom) and toward the ground. This arcuate path not only follows the natural motion of the rider's fingers during lever actuation but also converts the rotational force applied to finger grip bar 46 into a rectilinear force drawing the finger grip bar toward the handlebar.

The generation of the rectilinear force is best described in FIGS. 2a–2c. FIGS. 2a–2b are side views of the brake lever assembly looking inward along axis B in undeflected, partially deflected, and fully deflected lever positions, respectively. Applied forces F1, F2, F3 are shown acting on grasping surface 48 at the center of pressure of the rider's fingers bearing against finger grip bar 46. Assuming the applied force to be equal throughout lever actuation, F1=F2=F3. Lever 24 is configured to not only pivot about axis A, drawing finger grip bar 46 closer to the handlebar, but also to rotate about axis B, moving the finger grip bar along the front of the handlebar 22 toward the ground. In order to achieve this compound motion, finger grip bar 46 must be configured to cause the load applied by the rider's fingers to shift off-center with respect to rotation axis B during lever actuation, thereby generating the rectilinear force. This rectilinear force is transferred through the cable pulling arm 36 to the brake cable 32. In the undeflected brake lever position of FIG. 2a, applied load F1 acts substantially in-line with axis B, generating an equal and opposite reaction force R1 at a hinge 50 concentric with axis B. Because F1 is not eccentric with respect to R1 (i.e. e1=0), a counterbalancing force is not necessary (i.e. C1=0). In the partially deflected brake lever position of FIG. 2b, however, rotation of finger grip bar 46 has shifted applied load F2 to a new position that is offset from axis B by a distance e2. This load offset causes a rotational imbalance that is counterbalanced by a force C2 acting at a distance e2' from axis B (i.e. F2e2=C2e2'). The induced counterbalancing or leveraging force C2 in turn drives up the force R2 acting at hinge 50 in order to preserve the load balance (i.e. R2=F2+C2) on the brake lever 24. In other words, by offsetting the same applied force F2=F1 from the rotation axis B, the hinge force R2 is increased by an amount C2, C2 being the rectilinear force generated by the offset rotation moment F2e2. Likewise in FIG. 2c, constant applied load F3=F2=F1 is now further offset by a larger eccentricity e3 with respect to rotation axis B thereby generating an even greater counterbalancing force C3>C2 and inducing a larger hinge force R3. Boosted hinge force R3 provides additional mechanical advantage in comparison with conventional, single axis brake levers, enabling the rider to generate greater braking power and the desired brake feel. The levers around axes A and B compound to provide a multiple mechanical advantage not possible in a single-axis brake lever.

Figure 3F:
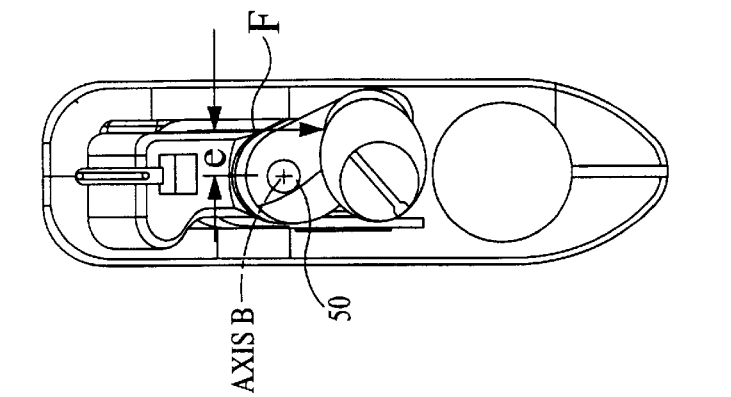
FIGS. 3d–3f are corresponding views of FIGS. 3a–3c, respectively, with the brake lever in a fully deflected position.
Figure 3D:
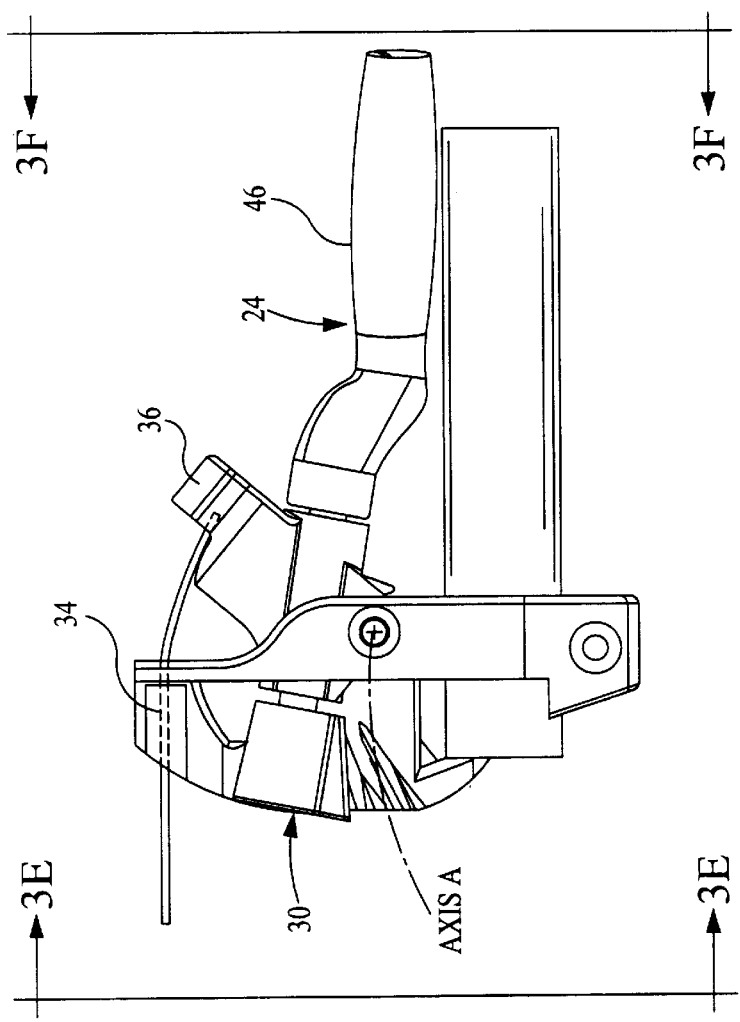
Figure 3E:
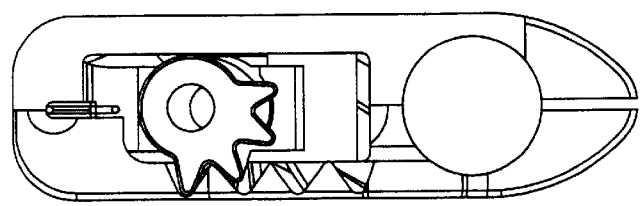

FIGS. 3a and 3d are top views of a second geared embodiment of the invention in which the transmission mechanism 30 (in this case, a rack and pinion) is disposed opposite the finger grip bar 46 with respect to pivot axis A, the brake lever 24 in undeflected and fully deflected positions, respectively. FIGS. 3b and 3c show corresponding side views of the second geared embodiment from opposite ends of the handlebar in an undeflected position, and FIGS. 3e and 3f show side views respectively corresponding to FIGS. 3b and 3c, but in a fully deflected position. As in the previous geared embodiment, the brake lever 24 is configured such that applied load F is offset from rotation axis B in a deflected position to achieve the desired increase in mechanical advantage.

Figure 4C:
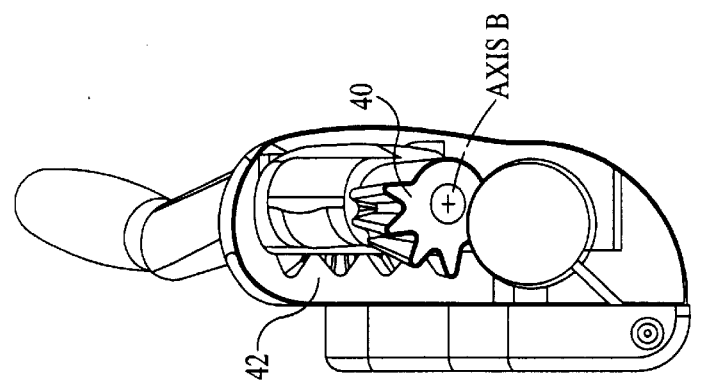
FIGS. 4b–4c are end views of the invention of FIG. 4a from opposite ends of the handlebar.
Figure 4A:
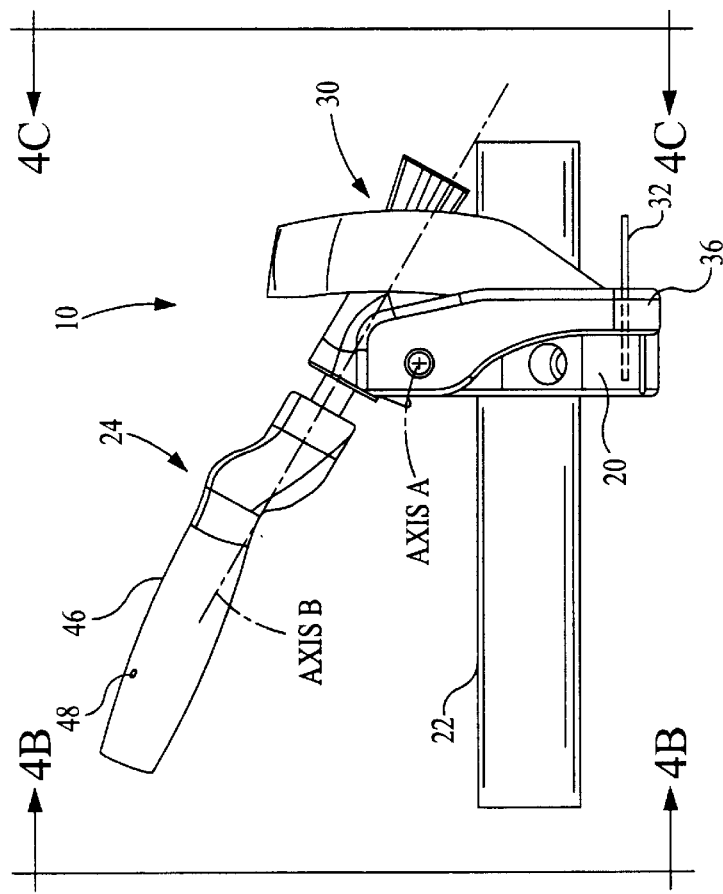
FIG. 4a is s top view of a third geared embodiment of the invention in which the cable pulling arm is disposed opposite the finger grip bar with respect to pivot axis A, the brake lever in an undeflected position.
Figure 4B:
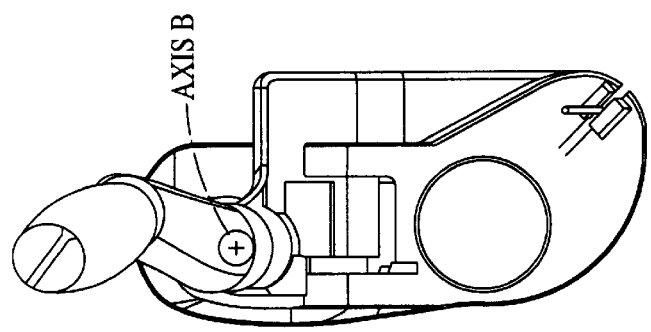
Figure 4F:
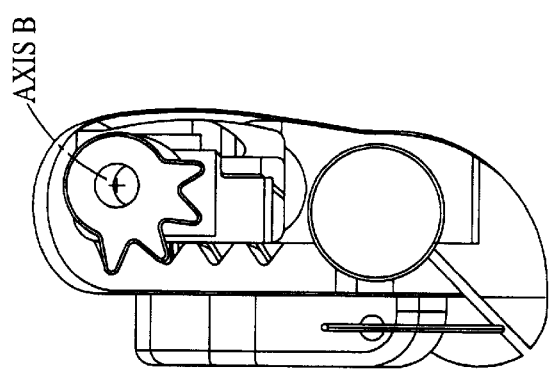
FIGS. 4d–4f are views corresponding to FIGS. 4a–4c, respectively, the brake lever being in a fully deflected position.
Figure 4D:
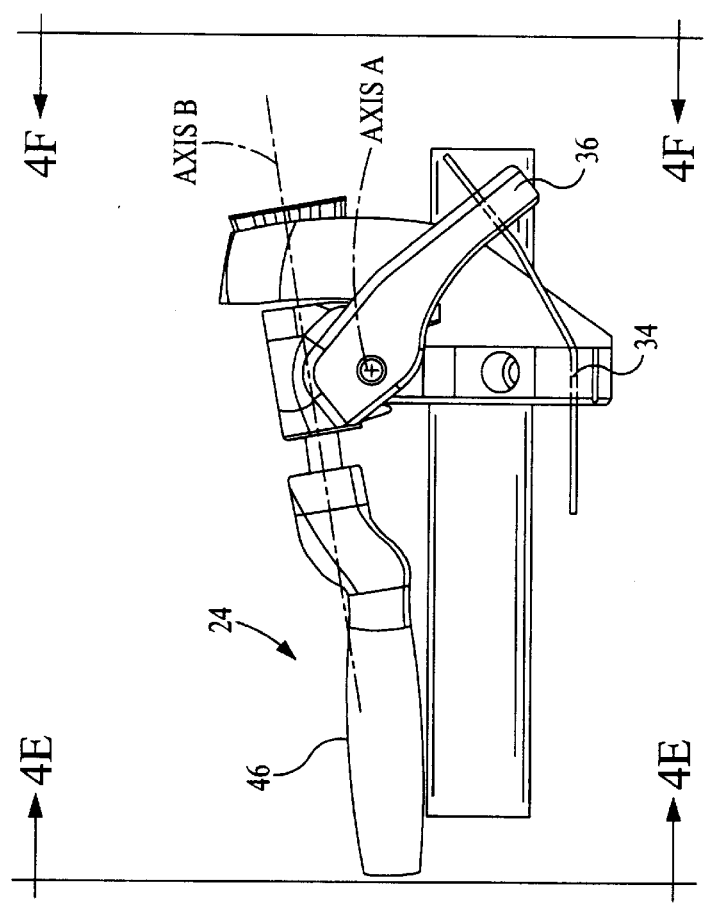
Figure 4E:
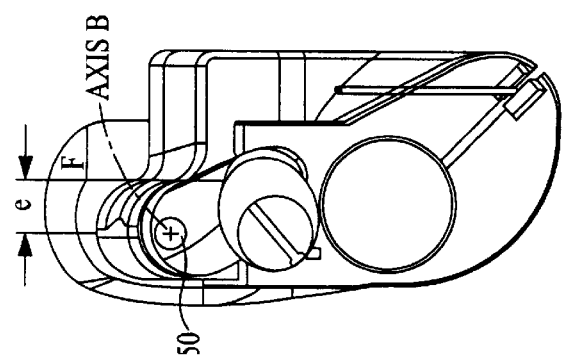

FIGS. 4a and 4d are top views of a third geared embodiment of the invention in which the cable pulling arm 36 is disposed opposite the finger grip bar 46 with respect to pivot axis A, the brake lever 24 in undeflected and fully deflected positions, respectively. FIGS. 4b, 4c and 4e, 4f show corresponding side views of the third geared embodiment from opposite ends of the handlebar. As in the prior geared embodiments, the brake lever 24 is configured such that applied load F is offset from rotation axis B in a deflected position to achieve the desired increase in mechanical advantage.

Figure 5A:
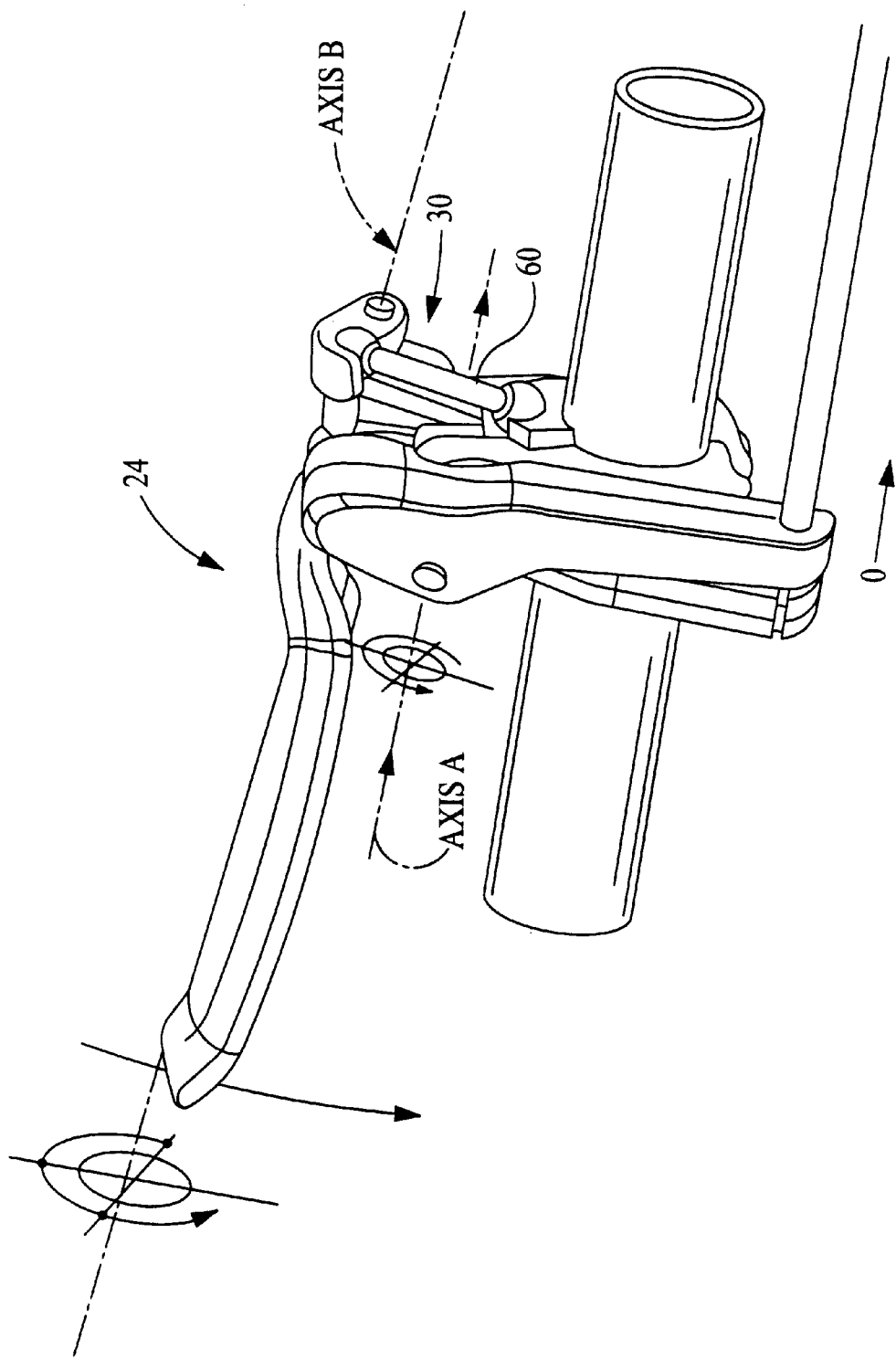

FIGS. 5a–5b are perspective views of an additional embodiment of the invention in which the transmission mechanism 30 includes a bar linkage 60, the brake lever 24 in undeflected and fully deflected positions, respectively. As in the previous geared embodiments of the invention, the bar linkages 60 forces rotation of lever 24 about rotation axis B as the lever is pivoted about pivot axis A to convert a rotation force applied to lever 24 into a rectilinear force drawing lever 24 toward the handlebar.

Figure 6:
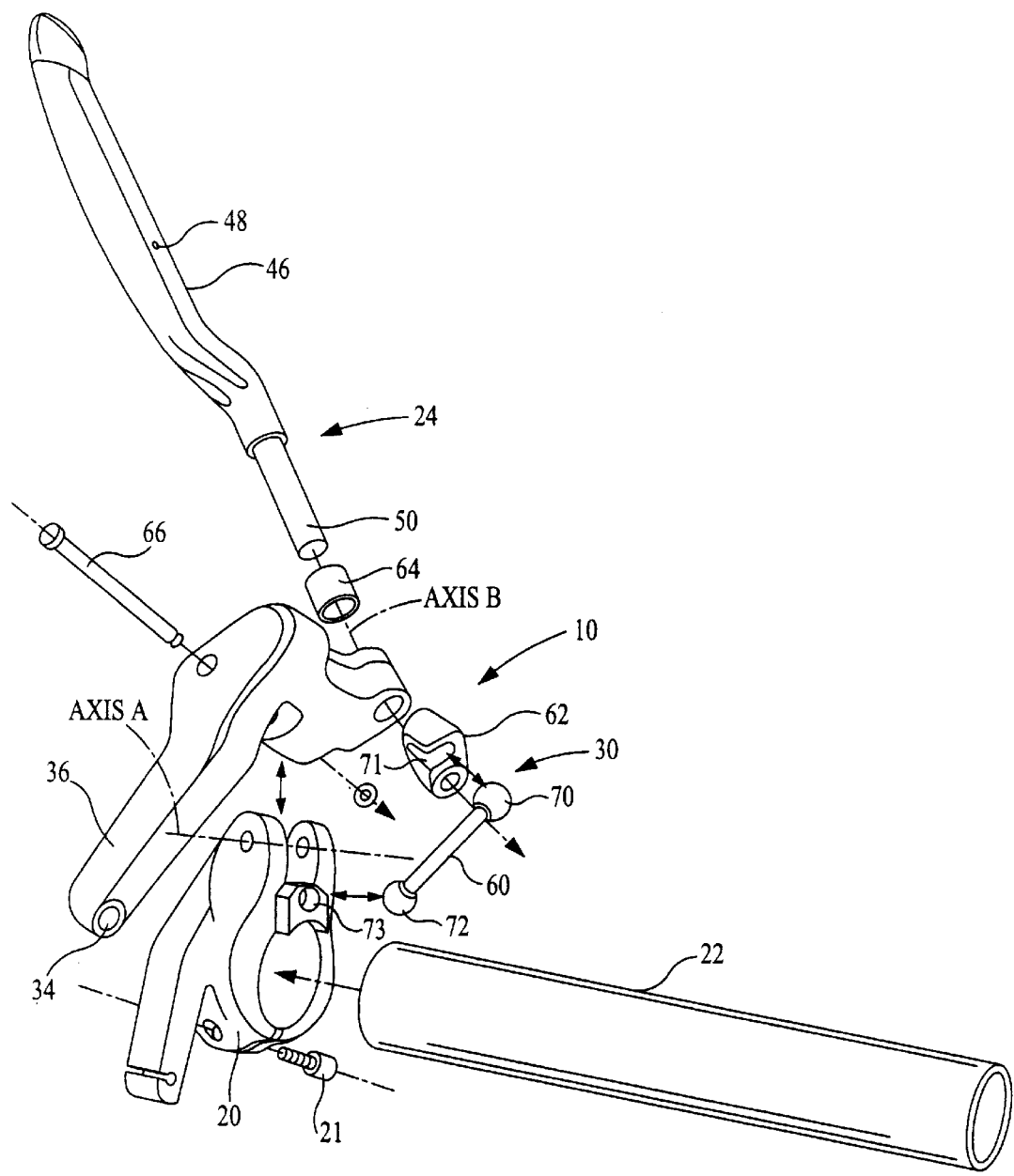
FIG. 6 is an exploded view of the components comprising the embodiment of FIGS. 5a–5b.

FIG. 6 is an exploded view of the components comprising the embodiment of FIGS. 5a–5b. Mounting bracket 20 is clamped to handlebar 22 using a screw 21. Brake lever 24 includes finger grip bar 46 hingedly coupled to cable pulling arm 36 at axis B and rotationally fixed to a pivot link 62, cable pulling arm 36 and finger grip bar 46 separated by a bushing 64. Brake lever 24 is pivotally connected to mounting bracket 20 at axis A by a pin. Bar linkage 60 is connected to the brake lever 24 by inserting ball 70 into socket 71 and to the mounting bracket 20 by inserting ball 72 into socket 73, the ball and socket joints being rotatably free.

Figure 5D:
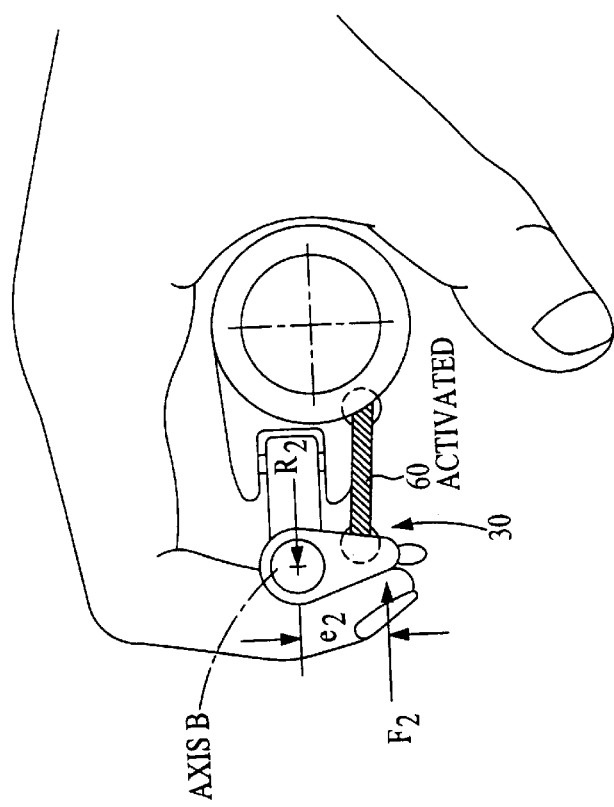
FIGS. 5c–5d are side views corresponding to the embodiment of FIGS. 5a–5b, respectively, with a rider's hand positioned on the brake lever assembly.
Figure 5C:
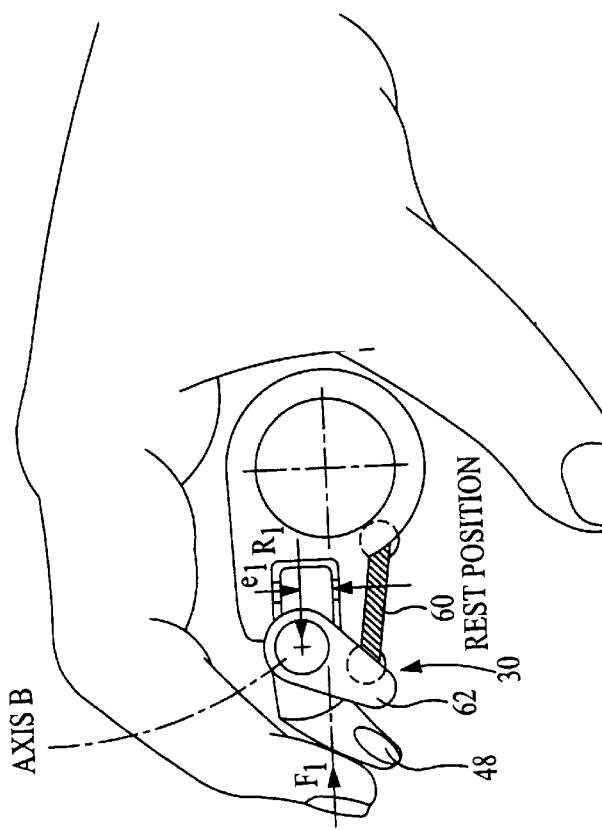

FIGS. 5c–5d are side views corresponding to the embodiment of FIGS. 5a–5b, respectively, showing a rider's hand positioned on the brake lever assembly. As in the previous embodiments, the transmission mechanism 30 and brake lever 24 are configured such that applied loads F1, F2 are offset from rotation axis B at some point during lever actuation. In the brake lever position of FIG. 5c, applied force F1 is already "leverage" at an eccentricity e1 from axis B thereby inducing a boosting rectilinear force from the onset of lever actuation. As in the geared embodiments, at the onset of lever rotation about axis A, bar linkage 60 (here shown loaded in compression) forces rotation of pivot link 62, and in turn lever 24 about rotation axis B, thereby producing the compound arched motion of the lever toward the handlebar and the ground, while converting rotational moment F1e1, and subsequently larger rotational moment F2e2 (i.e. F1=F2, e2>e1), into rectilinear forces contributing to increased reaction forces R1 and R2, respectively, at axis B.

Figure 7A:
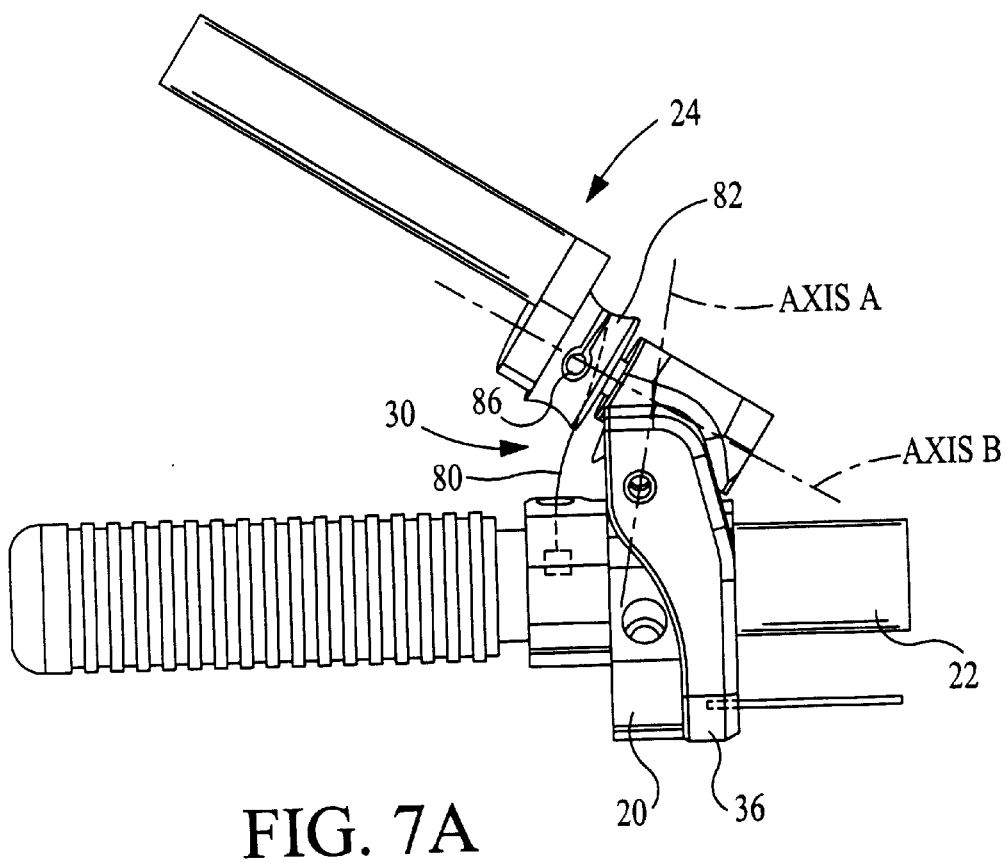
FIGS. 7a–7b are top views of an additional embodiment of the invention in which the transmission mechanism comprises a spooling cable, the brake lever in undeflected and fully deflected positions, respectively.
Figure 7B:
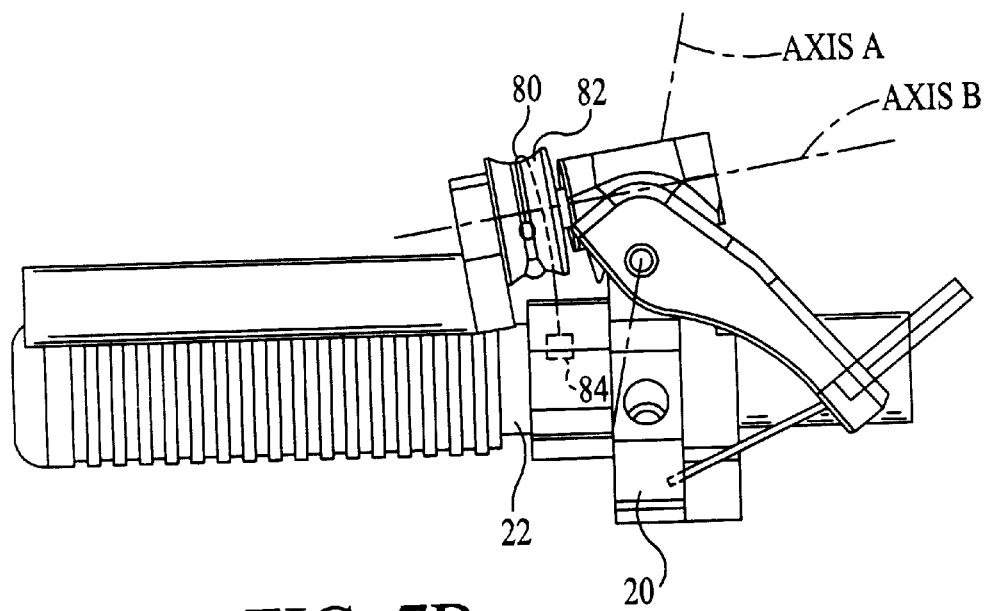
Figure 7C:
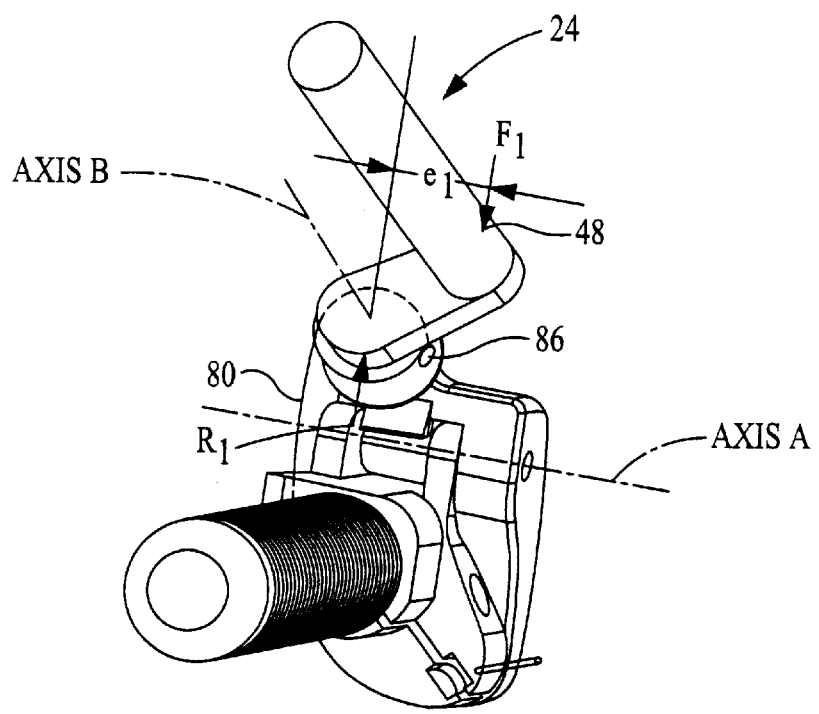
FIG. 7c is a perspective view of the embodiment of FIGS. 7a–7b with the brake lever in an undeflected position.
Figure 7D:
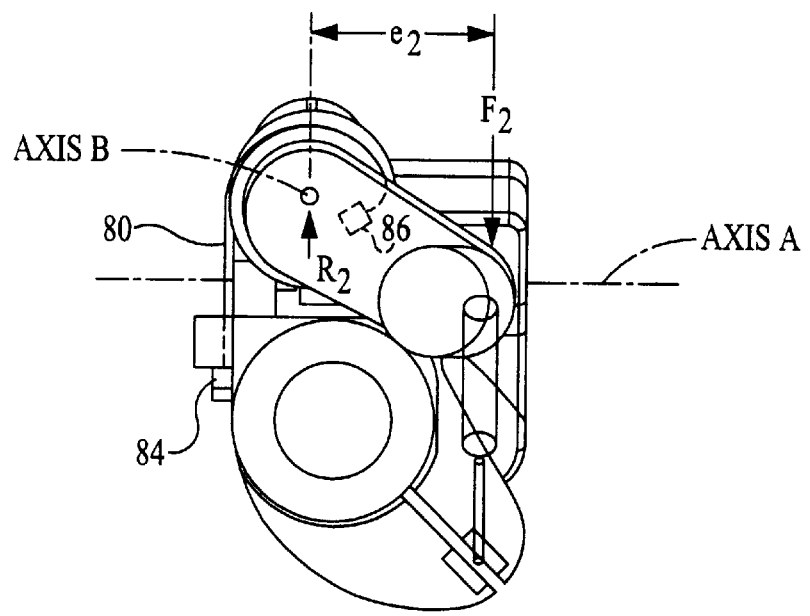
FIG. 7d is an end view of the embodiment of FIGS. 7a–7c with the brake lever in a fully deflected position.
Figure 8A:
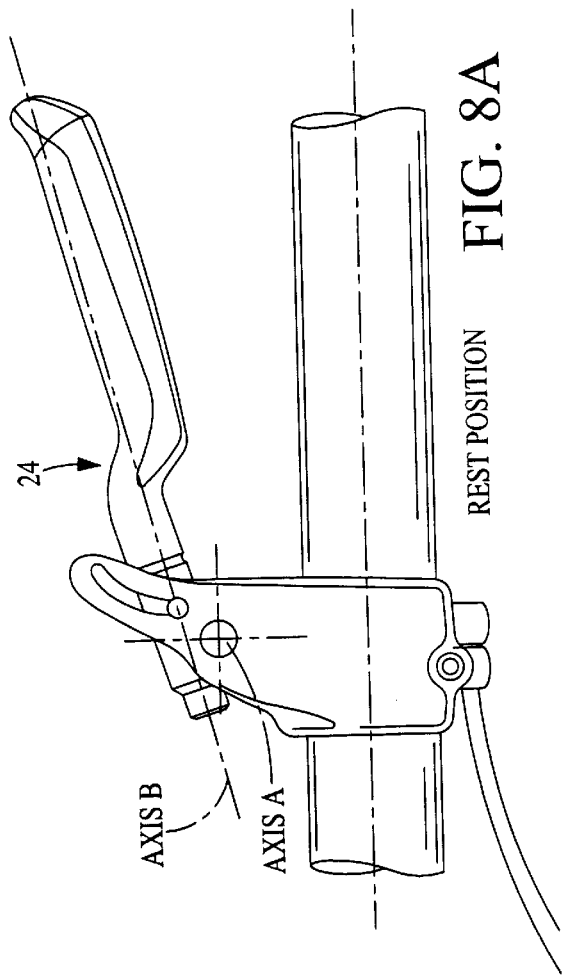
FIGS. 8a and 8c are top views of an additional embodiment of the invention in which the transmission mechanism comprises a ball and groove connection, the brake lever in undeflected and fully deflected positions, respectively.
Figure 8C:
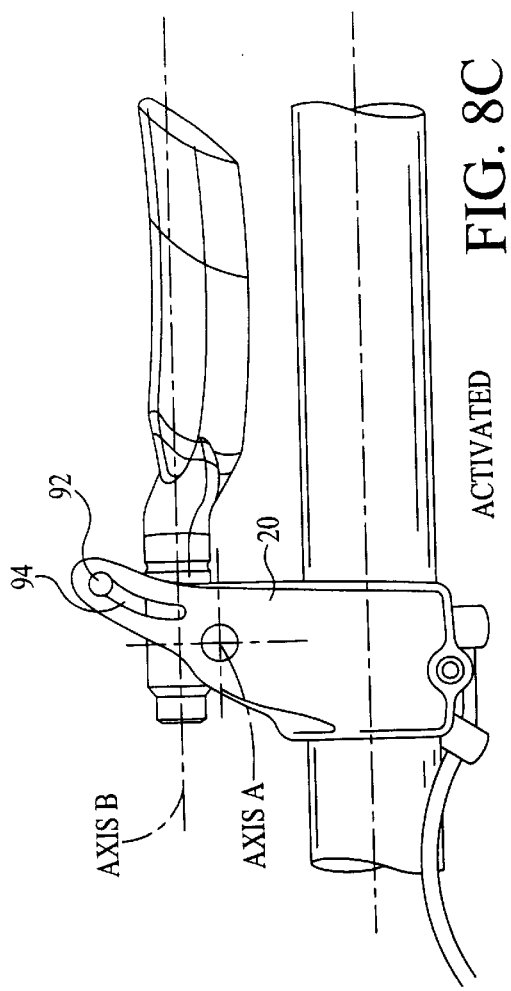
Figure 8B:
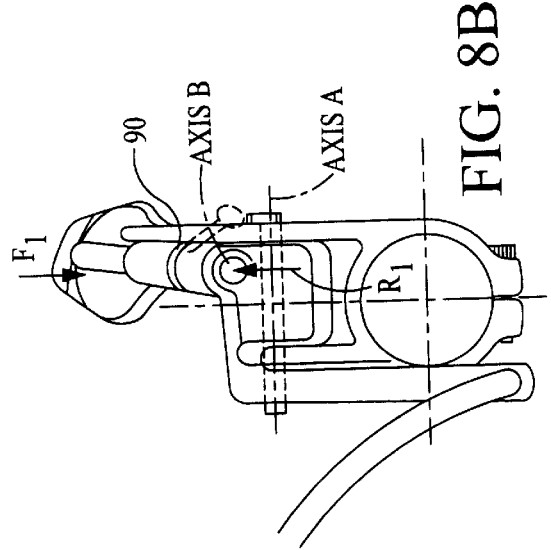
FIGS. 8b and 8d are side views of the embodiment of FIGS. 8a and 8c, respectively.
Figure 8D:
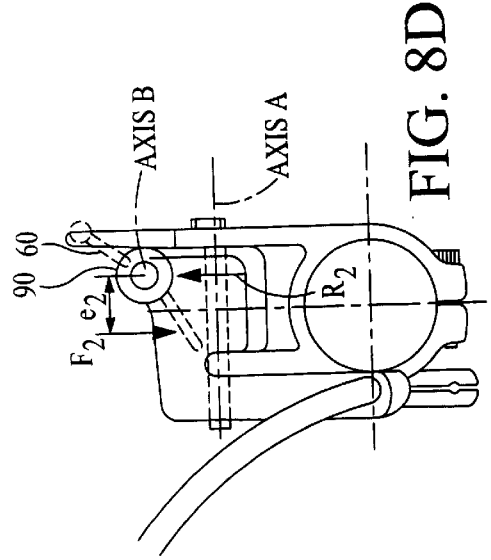

FIGS. 7a–7b are top views of an additional embodiment of the invention in which the transmission mechanism 30 comprises an interconnect cable 80 spooling about a groove 82 located on brake lever 24. Interconnect cable 80 is fixedly attached relative to the handlebar 22 at attachment point 84 (or alternatively to mounting bracket 20) draped along groove 82 and attached to the brake lever 24 at attachment point 86. FIGS. 7c and 7d are perspective and side views, respectively, of the embodiment of FIGS. 7a–7b, the brake lever in undeflected and fully deflected positions, respectively. Referring to FIG. 7c, lever 24 is configured such that applied load F1 is offset from rotation axis B a distance e1. At the onset of lever actuation, lever 24 pivots about axis A and rotates about axis B with cable 80 being spooled about groove 82 forcing the compound arched motion of the lever 24 toward the handlebar and the ground while converting rotational moment F1e1 into a boosted hinge force R1. In the fully deflected lever position of FIG. 7d, rotational moment F2e2 produces an even greater hinge force R2>R1.

FIGS. 8a, 8c and 8b, 8d are top and side views, respectively, of an additional bar linkage embodiment in which bar linkage 60 is connected to brake lever 24 at attachment point 90 and includes a ball 92 at its other end reciprocally sliding along groove 94 attached to mounting bracket 20. In operation, as lever 24 is pivoted about axis A bar linkage rides along groove 94 forcing rotation about rotation axis B. As in previous embodiments, lever 24 is configured such that applied load F2 (fully deflected position) is offset from rotation axis B thereby converting rotational moment F2e2 into a boosted reaction force R2 at axis B.

Figure 9:
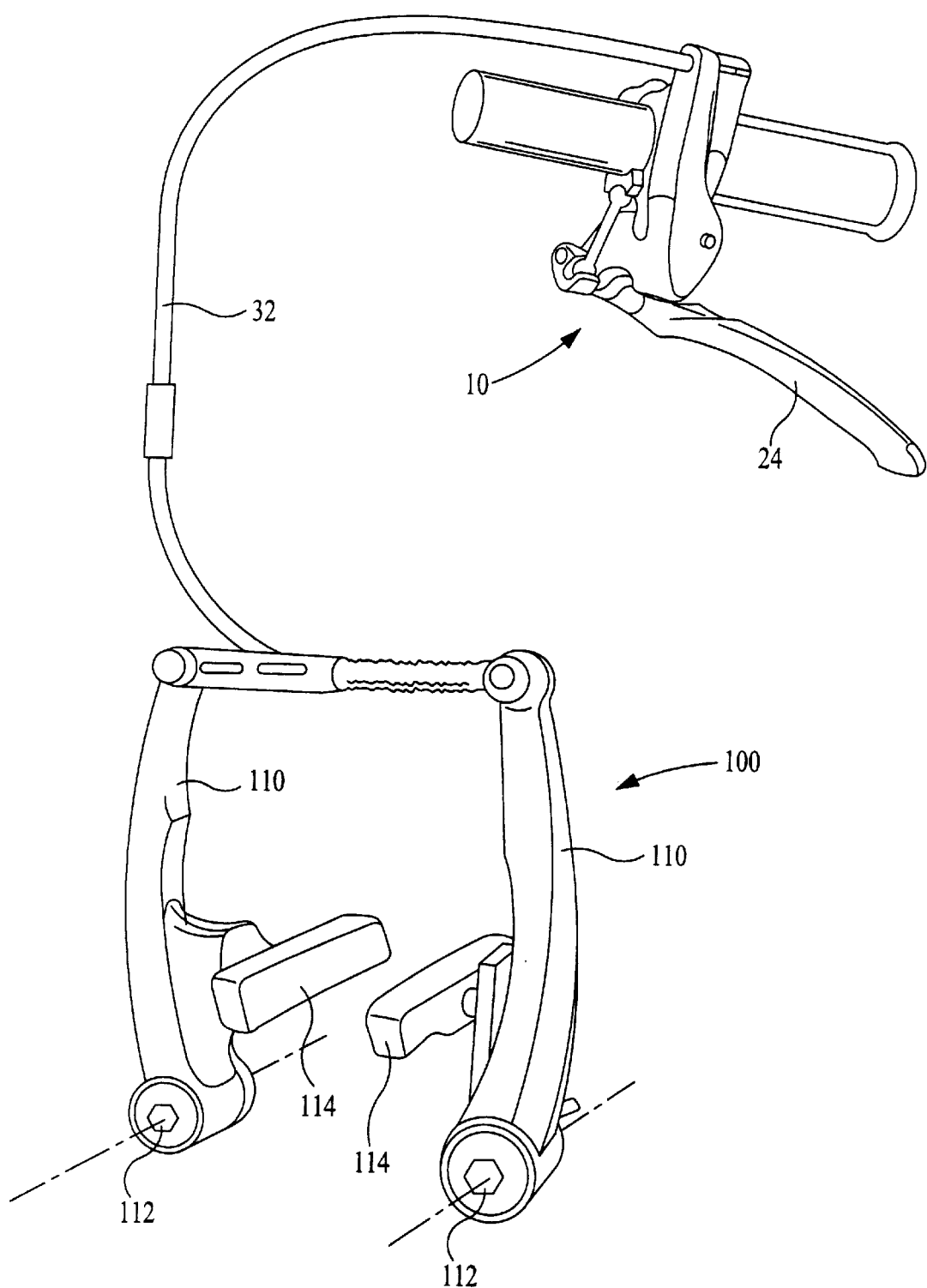
FIG. 9 is a perspective view of a brake lever assembly according to the invention connected by a brake cable to a responding cantilever brake assembly.

FIG. 9 is a perspective view of a brake lever assembly according to the invention connected by a brake cable 32 to a responding brake mechanism 100, in which actuation of the lever 24 rotates cantilever arms 110 about pivots 112 thereby causing brake pads 114 to clamp down on a wheel (not shown) located therebetween. While the forms of apparatus herein described constitute preferred embodiments of the invention, it should be understood that the invention is not limited to these forms and that changes may be made therein without departing from the scope of the invention. For example, the brake lever assemblies described herein for use on bicycles, has broad applications to all two-wheeled vehicles using cable actuated braking systems.

Figure 10A:
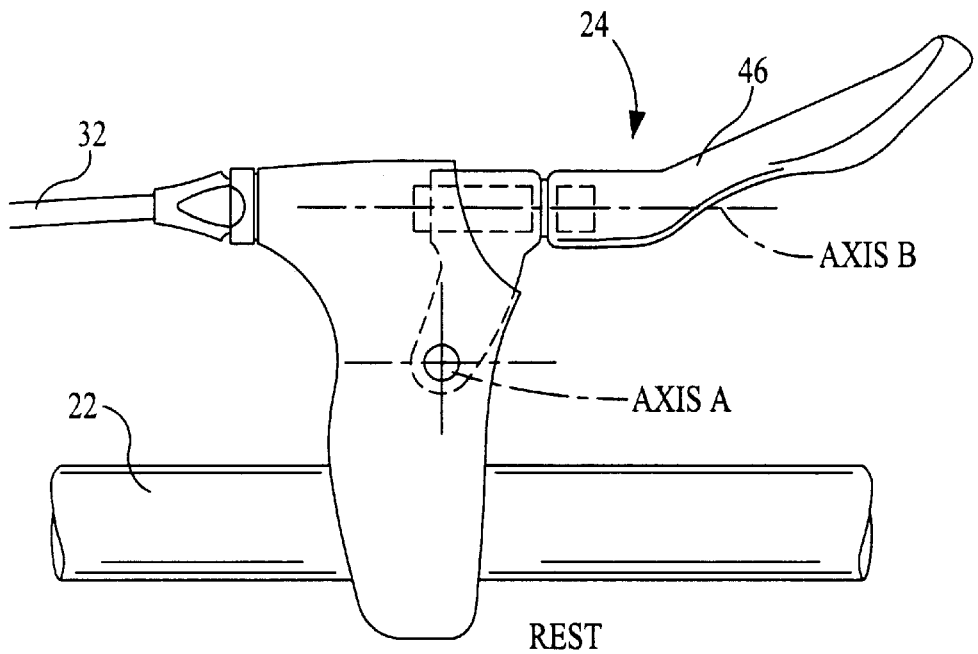
FIGS. 10a and 10b are side views if a brake lever assembly according to a further embodiment of the invention, in rest and fully deflected positions, respectively.
Figure 10B:
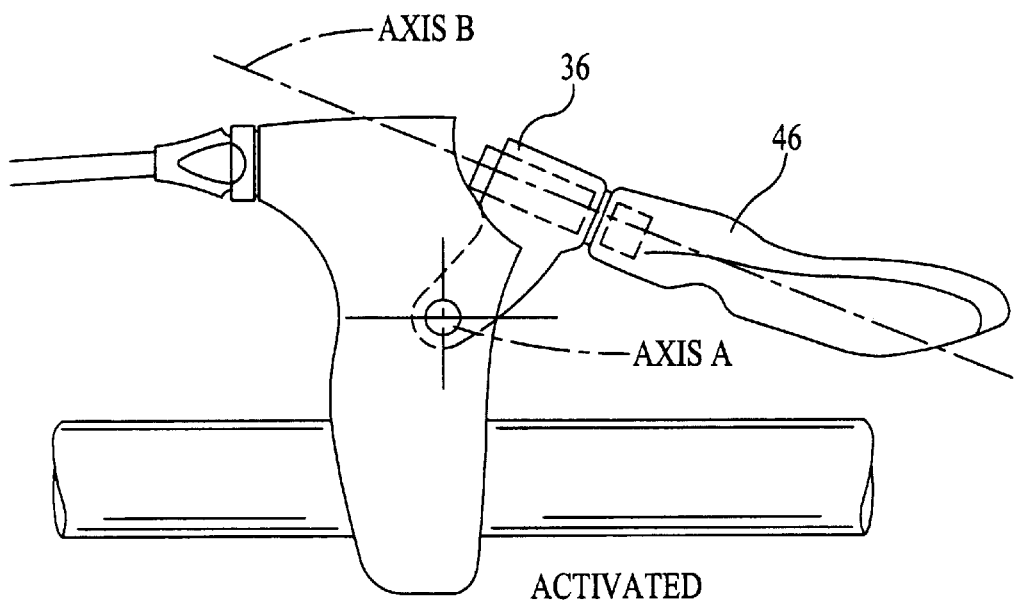

FIGS. 10a and 10b show an embodiment in which the lever 24 is rotatable about the pivot axis and also about a rotation axis, as before, showing lever 24 in undeflected and fully deflected positions, respectively. While in this embodiment no transmission mechanism exists to multiply the rider's mechanical advantage, the rotation of surface 46 around two axes permits a more natural, ergonomic fit to the contraction of the rider's fingers. The lever 46 is biased in its undeflected position with respect to axis B by a compression spring (not shown).

While the present invention has been described with respect to cable-pulling embodiments, it has equal application to other braking system types, such as hydraulic brakes in which braking force is transmitted by fluid pressure. The present invention is not limited by the illustrated embodiments but only by the scope and spirit of the claims which follow.

We claim:

1. A brake operating device, comprising:
   a mounting bracket for affixation to a handlebar and having a cable guide;
   a brake lever pivotally attached to said mounting bracket about a pivot axis, said brake lever rotatable about a rotation axis offset from the pivot axis; and
   a transmission mechanism for converting a rotational force applied to said brake lever into a rectilinear force drawing said brake lever toward the handlebar, wherein said transmission mechanism comprises a pinion segment disposed on the brake lever meshing with a rack disposed on the mounting bracket during brake lever actuation.

2. A brake operating device, comprising:
   a mounting bracket for affixation to a handlebar and having a cable guide;
   a brake lever pivotally attached to said mounting bracket about a pivot axis, said brake lever rotatable about a rotation axis offset from the pivot axis; and
   a transmission mechanism for converting a rotational force applied to said brake lever into a rectilinear force drawing said brake lever toward the handlebar, wherein said transmission mechanism comprises a cable interconnect, a first end of said cable interconnect fixed relative to said handlebar, a second end of said cable interconnect operatively connected to said brake lever, a portion of said cable interconnect being received in a groove formed in said brake lever proximate the second end of said cable interconnect as said brake lever is drawn toward the handlebar.

3. A brake operating mechanism according to claim 10, wherein the first end of said cable interconnect is attached to said mounting bracket.

4. A brake operating device, comprising:
   a mounting bracket for affixation to a handlebar and having a cable guide;
   a brake lever pivotally attached to said mounting bracket about a pivot axis, said brake lever rotatable about a rotation axis offset from the pivot axis; and
   a transmission mechanism for converting a rotational force applied to said brake lever into a rectilinear force drawing said brake lever toward the handlebar, wherein said transmission mechanism comprises a bar linkage, a first end of said bar linkage operatively connected relative to said handlebar, a second end of said bar linkage operatively connected to said brake lever at a location offset from said rotation axis so as to induce rotation of said brake lever about the rotation axis as said brake lever is drawn toward the handlebar.

5. A brake operating device according to claim 4 wherein the first end of said bar linkage is operatively connected to said mounting bracket.

6. A brake operating device according to claim 4, wherein the operative connection of the first and second ends of said bar linkage comprises ball and socket connections.

7. A brake operating device according to claim 4, wherein the operative connection of a first one of said first and second ends of said bar linkage comprises a ball and groove connection.

8. A brake operating device according to claim 7, wherein the first end of said bar linkage comprises a ball and groove connection and the second end of said bar linkage comprises a ball and socket connection.

\* \* \* \* \*